(12) United States Patent
Watanabe et al.

(10) Patent No.: US 8,916,289 B2
(45) Date of Patent: Dec. 23, 2014

(54) ELECTROCHEMICAL ELEMENT

(75) Inventors: Shunji Watanabe, Chiba (JP); Hideharu Onodera, Chiba (JP); Ryo Sato, Chiba (JP)

(73) Assignee: Seiko Instruments Inc., Chiba-shi (JP)

( * ) Notice: Subject to any disclaimer, the term of this patent is extended or adjusted under 35 U.S.C. 154(b) by 1270 days.

(21) Appl. No.: 12/036,795

(22) Filed: Feb. 25, 2008

(65) Prior Publication Data

US 2008/0206635 A1 Aug. 28, 2008

(30) Foreign Application Priority Data

Feb. 27, 2007 (JP) ................................ 2007-048074

(51) Int. Cl.
  *H01M 2/08* (2006.01)
  *H01M 2/06* (2006.01)
  *H01M 2/02* (2006.01)

(52) U.S. Cl.
  CPC .......... *H01M 2/08* (2013.01); *Y02E 60/12* (2013.01); *H01M 2/06* (2013.01); *H01M 2/0222* (2013.01)
  USPC ............ 429/185; 429/162; 429/163; 429/179

(58) Field of Classification Search
  CPC ....... H01M 2/0222; H01M 2/06; H01M 2/08; H01M 2/0426; H01M 2/021; H01M 10/0427; Y02E 60/12
  USPC ................ 429/162, 163, 175, 176, 179, 185; 361/502, 503, 508, 509, 523
  See application file for complete search history.

(56) References Cited

U.S. PATENT DOCUMENTS

| | | | |
|---|---|---|---|
| 6,445,566 B2 * | 9/2002 | Watanabe et al. ............ | 361/502 |
| 7,108,941 B2 * | 9/2006 | Hayashi et al. ............... | 429/162 |
| 7,468,222 B2 | 12/2008 | Takahashi et al. | |
| 7,697,265 B2 * | 4/2010 | Umemoto et al. ............ | 361/502 |
| 2004/0157121 A1 * | 8/2004 | Watanabe et al. ............ | 429/185 |
| 2005/0158628 A1 * | 7/2005 | Watanabe et al. ............ | 429/245 |
| 2006/0035143 A1 * | 2/2006 | Kida et al. .................... | 429/185 |
| 2006/0040177 A1 * | 2/2006 | Onodera et al. ............. | 429/174 |
| 2006/0105233 A1 * | 5/2006 | Morita .......................... | 429/162 |
| 2008/0206635 A1 * | 8/2008 | Watanabe et al. ............ | 429/185 |

FOREIGN PATENT DOCUMENTS

| | | |
|---|---|---|
| JP | 2001-216952 A | 8/2001 |
| JP | 2004319097 A | 11/2004 |
| JP | 2004-356009 A | 12/2004 |
| JP | 2004356462 A | 12/2004 |
| JP | 2005191455 A | 7/2005 |
| JP | 2006222221 A | 8/2006 |
| JP | 2007012921 A | 1/2007 |

* cited by examiner

*Primary Examiner* — Raymond Alejandro
(74) *Attorney, Agent, or Firm* — Seager, Tufte & Wickhem LLC

(57) ABSTRACT

An electrochemical element comprises a container and a sealing plate for sealing an opening of the container. The container is sealed with the sealing plate by welding a portion of the brazing material on the sealing plate and a portion of the metal film of the container which make contact with each other together in a state where a first electrode active material, a separator, a second electrode active material and an electrolyte are contained in the container. An electricity collector sheet is electrically connected to the first electrode active material or the second electrode active material, whichever is closer to the opening of the container. At least a portion of the electricity collector sheet extends to the end portion of the container so that the container and the sealing plate are welded together with the extending portion of the electricity collector sheet in between. Thus, the manufacturing process may be simplified so that the welding of the container and the sealing plate can be easily carried out even when the container and the sealing plate are reduced in size.

8 Claims, 3 Drawing Sheets

ELECTROCHEMICAL ELEMENT

CROSS-REFERENCE TO RELATED APPLICATION(S)

This application is based upon and claims the benefit of priority from prior Japanese Patent Application No. 2007-048074, filed on Feb. 27, 2007, the entire content of which is incorporated herein by reference.

This application is related to U.S. patent application Ser. No. 12/036,698, filed the same day herewith, and is also related to U.S. patent application Ser. No. 12/036,748, filed the same day herewith.

FIELD OF THE INVENTION

The present invention relates to an electrochemical element, such as a non-aqueous electrolyte battery or an electric double layer capacitor.

BACKGROUND

Electrochemical elements, such as non-aqueous electrolyte batteries and electric double layer capacitors, are used as back-up power sources for time-keeping functions, back-up power sources for semiconductor memories, auxiliary power sources for electronic devices, such as microcomputers and IC memories, batteries for solar powered watches, and power sources for driving a motor. Furthermore, in recent years, electrochemical elements have attracted attention as power sources for electrical automobiles and auxiliary systems for energy converting and storing systems.

The introduction of non-volatile memories for semiconductor memories and the reduction in the power consumption for elements having time-keeping functions make electrochemical elements having a large capacitance and large current less necessary. Rather, it is strongly desired to make it possible to mount electrochemical elements on a substrate by reducing the thickness of the element and developing reflow soldering.

Therefore, electrochemical elements in round form, such as coin and button forms, and electrochemical elements in square form have been proposed as described in Japanese Unexamined Patent Publication No. 2001-216952 and Japanese Unexamined Patent Publication No. 2004-356009. When the electrochemical element is in square form, the element cannot be sealed by crimping the container in square box form, unlike the electrochemical element in round form. Thus, a sealing plate is resistance welded to the upper portion of the container in square box form. In particular, an electrode pair made up of a positive electrode and a negative electrode, a separator, an electrolyte and the like are contained inside the square-box container, the sealing plate is placed on the upper portion thereof, and seam welding using resistance welding is carried out.

When seam welding using resistance welding is carried out, an electrode active material used for a negative electrode is pasted to the sealing plate in advance so that the negative electrode pasted to the sealing plate is compressed into the container from the top, and welding is carried out in a state where the sealing plate is pressed against the container. Therefore, there is a pasting process for pasting an electrode active material to the sealing plate before welding. When pasting between the electrode active material and the sealing plate is incomplete, the electrode active material is peeled from the plate, which may become the cause for malfunction, such as an increase in the internal resistance. Therefore, the pasting process requires a long period of time and a high level technology in order to secure the reliable pasting between the sealing plate and the electrode active material.

In addition, as electronic devices have been recently miniaturized, electrochemical elements have been required to be reduced in size. It is becoming more and more difficult to paste an electrode active material to a sealing plate which is small in size, which has become a problem in increasing the production efficiency and the reliability of the products.

SUMMARY

An object of the present invention is to provide a reliable electrochemical element, the manufacturing process of which can be simplified so that the welding of the container and the sealing plate can be easily carried out even when the container and the sealing plate are reduced in size.

According to an aspect of the invention, an electrochemical element is provided. The electrochemical element includes a container having an end portion and an outer surface: and a sealing plate for sealing an opening of the container. The end portion defines an opening. A metal film is formed on the end portion. A pair of external terminals are formed on the outer surface. The metal film is electrically connected to one of the pair of external terminals. A brazing material is placed on the sealing plate. The container is sealed with the sealing plate by welding a portion of the brazing material on the sealing plate and a portion of the metal film of the container which make contact with each other together in a state where a first electrode active material, a separator, a second electrode active material and an electrolyte are contained in the container. The electrochemical element further comprises an electricity collector sheet, which is electrically connected to the first electrode active material or the second electrode active material, whichever is closer to the opening of the container. At least a portion of the electricity collector sheet extends to the end portion of the container so that the container and the sealing plate are welded together with the extending portion of the electricity collector sheet in between.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DESCRIPTION OF EXEMPLARY EMBODIMENTS

In the following, the electric double layer capacitor according to the first embodiment of the present invention is described with reference to FIGS. 1 and 2.

Figure 1:
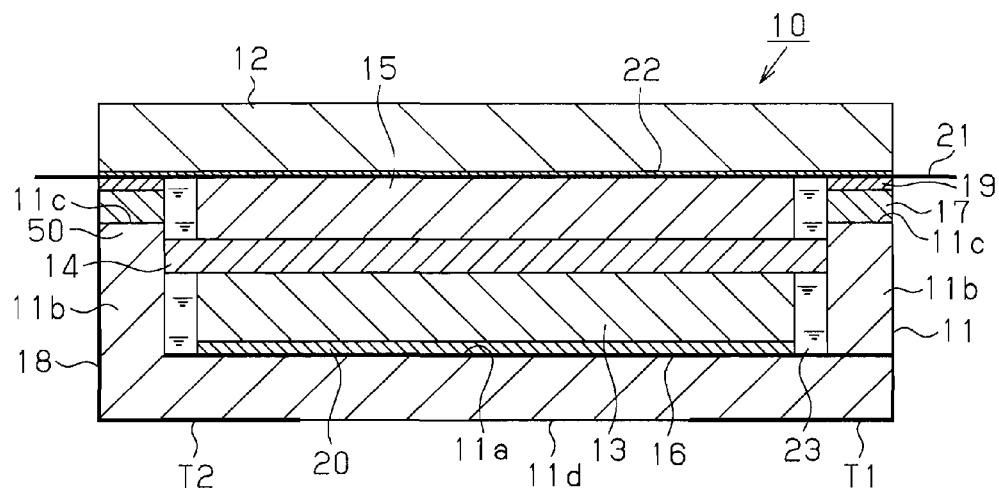
FIG. 1 is a cross sectional diagram illustrating an electric double layer capacitor according to the first embodiment.

FIG. 1 is a cross sectional diagram illustrating a rectangular-parallelepiped electric double layer capacitor, which is an electrochemical element. In FIG. 1, an electric double layer capacitor 10 has a container 11 in square box form having a recess with an opening at the top and a sealing plate for sealing the opening 12 which covers the opening defined by the upper end portion 50 of the container 11, in other words, covers the upper end of the recess when welded to the container 11. The container 11 covered with the sealing plate 12 is formed so as to contain a capacitor cell having a positive electrode active material 13, which is a first electrode active material, a separator 14 and a negative electrode active material 15, which is a second electrode active material. In the present embodiment, the size of the container 11 is 5 mm (length)×5 mm (width)×1 mm (height) and the size of the recess in the container 11 is 4.6 mm (length)×4.6 mm (width)×0.6 mm (depth). The size of the sealing plate 12 is 5 mm (length)×5 mm (width)×0.15 mm (height).

A positive electrode electricity collector 16 is formed of a tungsten layer having a high withstanding voltage on the entirety of the surface of the inner bottom 11a of the container 11. A metal ring 17 in square annular form is formed of Kovar (i.e., an alloy with the ratio of 17% cobalt, 29% nickel and the remaining iron) on the upper surfaces 11c of the four side walls 11b of the container 11. The right side of the positive electrode electricity collector 16 is electrically connected to a first external terminal T1 which penetrates through a side wall 11b and extends to the right of the bottom surface 11d of the container 11. The metal ring 17 is electrically connected to a second external terminal T2 which extends to the left of the bottom surface lid of the container 11 via a conductive film 18 made of a tungsten layer which extends on the outer surface of the side wall 11b on the left side.

The container 11 is made of alumina and formed by sintering a plurality of green sheets layered on top of each other. In particular, tungsten, which is a material for the positive electrode electricity collector 16 and the conductive film 18, is printed on green sheets before sintering, and, Kovar, which is a material for the metal ring 17, is placed on the upper surfaces 11c of the side walls 11b. Then the positive electrode electricity collector 16, the metal ring 17 and the conductive film 18 are formed on the container 11 through sintering.

The coefficient of thermal expansion ($5.2 \times 10^{-16}$/° C.) of the metal ring 17 formed of Kovar and the coefficient of thermal expansion ($6.8 \times 10^{-16}$/° C.) of the container 11 made of alumina have very close values, and thus, difference caused by a change in the volume due to thermal expansion is very small.

The first external terminal T1 and the second external terminal T2 are formed by carrying out nickel and gold plating on the sintered container 11. In the same manner, a brazing material 19 is formed on the upper portion of this metal ring 17 through nickel and gold plating.

The positive electrode active material 13 is placed on the upper surface of the positive electrode electricity collector 16. The positive electrode active material 13 is pasted to the positive electrode electricity collector 16 via a conductive adhesive 20 containing carbon and electrically connected to this positive electrode electricity collector 16. The separator 14 is placed on the upper side of the positive electrode active material 13 and the negative electrode active material 15 is placed on the upper side of the separator 14.

It is preferable for the separator 14 to be made of unwoven cloth having heat resistance. Separators using a resin or glass fibers having heat resistance shrink little, which is preferable. The resin is preferably polyphenylene sulfide (PPS) or polyether ether ketone (PEEK). The glass fibers are particularly effective. In addition, the separator 14 may be formed of porous ceramics. On the other hand, separators made of a porous film which has been rolled are not desirable. This is because such a porous film has resistance to heat but shrinks in the rolled direction due to heat at the time of seam welding using resistance welding, thus making it easy for internal short circuiting to occur though the film.

The negative electrode active material 15 and a negative electrode electricity collector sheet 21 are integrally formed, and the sheet 21 serves as an electricity collector. In the present embodiment, the sheet 21 is a sheet made of nickel having a thickness of 5 micrometers, and the negative electrode active material 15 is formed on top of the sheet 21. The sheet 21 is a square form and extends through the top of the upper surfaces 11c of the side walls 11b so as to exceed the upper surfaces 11c, in other words, extend to a location protruding from the upper surfaces 11c.

The sealing plate 12 is welded to the upper surfaces 11c of the side walls 11b. The sealing plate 12 is formed of Kovar, which is the same material as that for the above described metal ring 17, and thus, has the same coefficient of thermal expansion as the metal ring 17. A brazing material 22 formed of nickel is plated on the entire lower surface of the sealing plate 12, in other words, on the surface of the sealing plate 12 facing the container 11. When the sealing plate 12 is welded to the side walls 11b of the container 11, the brazing material 22 and the metal ring 17 (brazing material 19) on top of the upper surfaces 11c of the side walls 11b are joined, and thus, the negative electrode electricity collector sheet 21 between the metal ring 17 and the brazing material 22 is also integrated when the metal ring 17 and the brazing material 22 are joined. As a result, the sheet 21 is electrically connected to the second external terminal T2 via the conductive film 18.

In the present embodiment, a parallel seam welding machine, in which the principle of resistance welding is applied, is used so that the respective pairs of the two sides facing each other of the sealing plate 12 are simultaneously welded. In addition, when the sealing plate 12 is welded to the container 11, the positive electrode active material 13, the separator 14, and the negative electrode active material 15 are contained within the container 11 in a state of being pressed by the sealing plate 12 from the top and the electrolyte 23 is also contained. Furthermore, the pressure from the sealing plate 12 makes the negative electrode active material 15 and the positive electrode active material 13 press against each other, thus providing effects of lowering the internal resistance.

Figure 2:
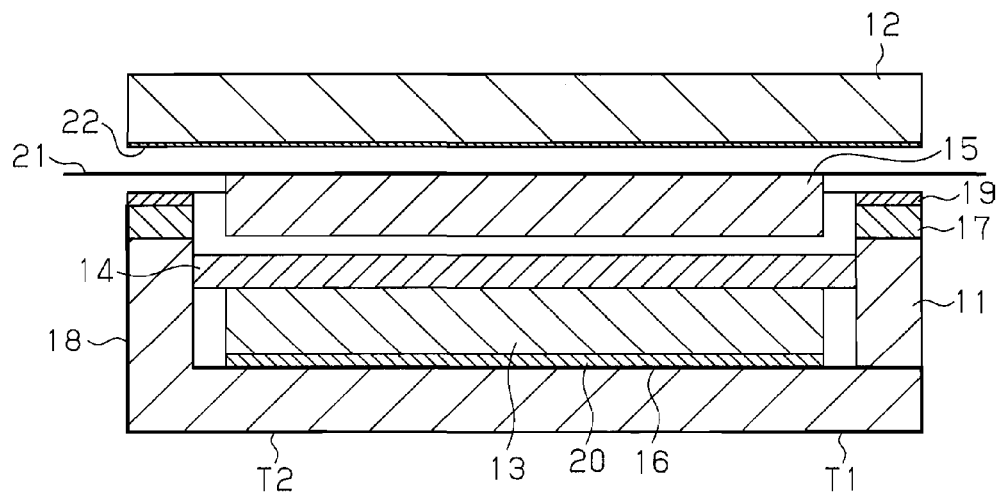
FIG. 2 is a cross sectional diagram illustrating a manufacturing method for the capacitor of FIG. 1.

In more specifically, as shown in FIG. 2, the positive electrode active material 13 is first placed inside the container 11. At this point, the conductive adhesive 20 is attached to the lower surface of the positive electrode active material 13, and the positive electrode active material 13 and the positive electrode electricity collector 16 are placed so as to be electrically connected to each other. Subsequently, the separator 14 is placed on the upper surface of the positive electrode electricity collector 16, and then the negative electrode active material 15, which is integrally formed with the negative electrode electricity collector sheet 21, is placed. The sheet 21 is made to have a size greater than the negative electrode active material 15 and placed so as to completely close the opening of the container 11. In this state, the upper surface of the negative electrode active material 15 protrudes slightly above the opening of the container 11. Next, the electrolyte 23 is injected into the container 11.

After the injection of the electrolyte 23, the sealing plate 12 is made make contact with the upper surface of the side walls 11b or the brazing material 19 from the top so as to completely close the opening of the container 11. At this point, the positive electrode active material 13, the separator 14 and the negative electrode active material 15 are compressed and contained in the container 11 via the negative electrode electricity collector sheet 21. Then, the container 11 and the sealing plate 12 are welded using the parallel seam welding machine, and thus, an electric double layer capacitor 10 is completed.

The present embodiment has the following advantages.

In the present embodiment, the negative electrode electricity collector sheet 21 protrudes in the four directions from the opening of the container 11, and the sealing plate 12 and the container 11 are welded in a state that the protruding portion of the sheet 21 is sandwiched between the sealing plate 12 and the upper surfaces 11c of the side walls 11b of the container 11.

Accordingly, the process for pasting the negative electrode active material to the sealing plate can be omitted so that the manufacturing process can be simplified. In addition, there is no increase in the internal resistance of the electrochemical element due to the peeling of the active material from the sealing plate.

In addition, the sheet 21 is formed in such a size as to protrude in the four directions from the opening of the container 11 and is just sandwiched between the sealing plate 12 and the container 11. Therefore, precise positioning and adjustment beforehand are not necessary but welding can be carried out precisely. In particular, the smaller the size of the container 11 and the sealing plate 12 becomes, the easier the welding can be carried out on the container 11 and the sealing plate 12 according to the level of technology which is required.

In the present embodiment, the metal ring 17 formed on the side walls 11b of the container 11 is formed of Kovar having a coefficient of thermal expansion ($5.2 \times 10^{-16}/^\circ$ C.), which is close to the coefficient of thermal expansion ($6.8 \times 10^{-16}/^\circ$ C.) of the container 11 made of alumina. Accordingly, difference caused by a change in the volume can be made small at the time of welding, and thus, highly reliable welding can be carried out. In addition, difference caused by a change in the volume through reflow soldering, which is carried out when the electric double layer capacitor 10 is mounted on the surface of a substrate, is also small, and the welded portions are not damaged.

In the present embodiment, the sealing plate 12 and the metal ring 17 are formed of the same material, Kovar, and have the same coefficient of thermal expansion. Accordingly, no difference is caused by a change in the volume at the time of welding, and highly reliable welding can be carried out. In addition, difference caused by a change in the volume through reflow soldering, which is carried out when the electric double layer capacitor 10 is mounted on the surface of a substrate, is also small, and the welded portions are not damaged.

In the present embodiment, tungsten having a high withstanding voltage is used in the positive electrode electricity collector 16. Accordingly, when a high potential is applied to the plus electrode or the positive electrode side, no material is fused.

Next, the electric double layer capacitor according to the second embodiment of the present invention is described with reference to FIGS. 3 and 4.

The second embodiment is different from the first embodiment in the configuration of the capacitor cell having a positive electrode active material, a separator and a negative electrode active material which are contained within the container 11. Accordingly, the same symbols denote the same elements for the purpose of explanation and the detailed descriptions thereof are omitted.

Figure 3:
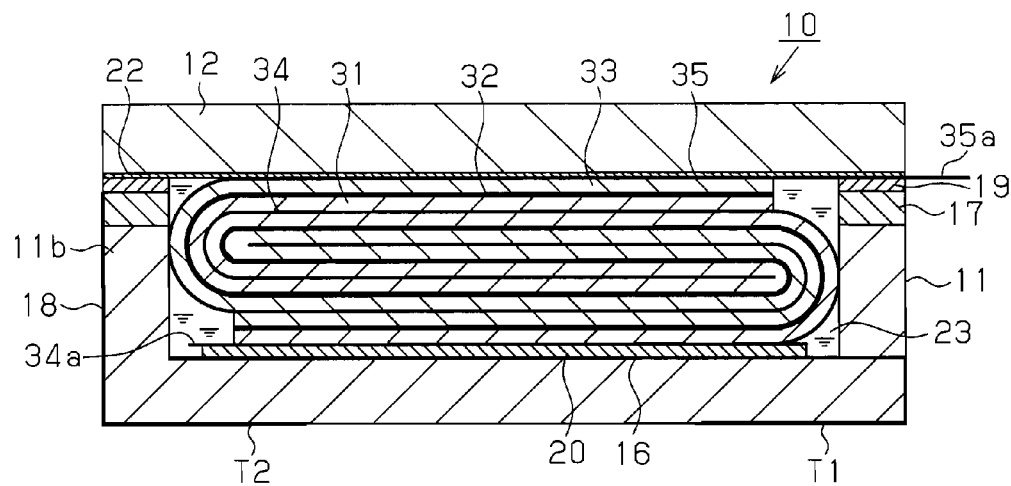
FIG. 3 is a cross sectional diagram illustrating an electric double layer capacitor according to the second embodiment.
Figure 4:
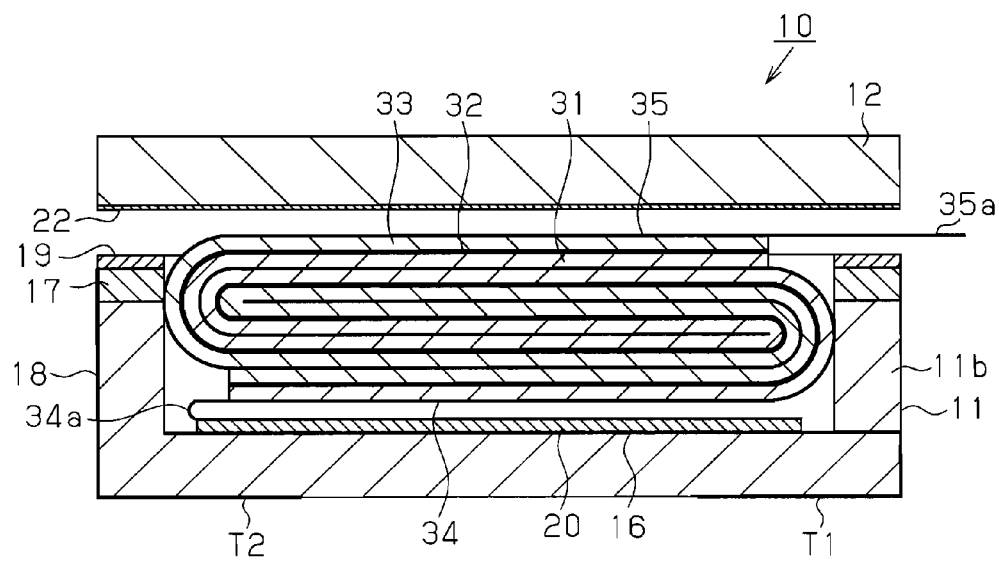
FIG. 4 is a cross sectional diagram illustrating a manufacturing method for the capacitor of FIG. 3.

In FIG. 3, the capacitor cell contained in the container 11 is a foldable sheet where a positive electrode active material 31, a separator 32 and a negative electrode active material 33 are respectively formed in a sheet. The positive electrode active material 31 is layered on top of the negative electrode active material 33 via the separator 32.

A positive electrode electricity collector sheet 34 is pasted to the surface of the positive electrode active material 31 on the side opposite to the separator 32. The positive electrode electricity collector sheet 34 completely covers the positive electrode active material 31 and has an extending portion 34a at a first end of the sheet 34 in the longitudinal direction.

A negative electrode electricity collector sheet 35 is pasted to the surface of the negative electrode active material 33 on the side opposite to the separator 32. The negative electrode electricity collector sheet 35 completely covers the negative electrode active material 33 and has an extending portion 35a at a second end of the sheet 35 in the longitudinal direction on the side opposite to the first end of the sheet 34.

The capacitor cell in sheet form, which is formed as described above, is folded so that the capacitor cell is contained in the container 11. The capacitor cell in sheet form is folded in such a manner as to be wound as shown in FIG. 4 where the negative electrode electricity collector sheet 35 appears on one side and the positive electrode electricity collector sheet 34 appears on the other side.

Thus, the folded cell capacitor is contained in the container 11 in such a manner that the side where the positive electrode electricity collector sheet 34 of the cell capacitor appears enters into the container first. At this point, as shown in FIG. 4, the extending portion 34a of the sheet 34 is folded and electrically connected to the positive electrode electricity collector 16 via a conductive adhesive 20. Meanwhile, the extending portion 35a of the negative electrode electricity collector sheet 35, which faces the opening side of the container 11, protrudes outside through a location above the upper surface 11c of the side wall 11b on the right side.

In this state, an electrolyte 23 is injected into the container 11. After that, the sealing plate 12 is made to make contact with the upper surfaces (brazing material 19) of the side walls 11b from above so as to completely close the opening of the container 11. At this point, the capacitor cell is compressed and contained in the container 11. Then, a parallel seam welding machine is used so that the container 11 and the sealing plate 12 are welded, and thus, an electric double layer capacitor 10 is completed.

The second embodiment has the same effects as the first embodiment. The process for pasting the negative electrode active material 33 to the plate for closing the opening can be omitted so that the manufacturing process can be simplified, and in addition, welding can be easily carried out on the container 11 and the sealing plate 12 even in the case where the container 11 and the sealing plate 12 are reduced in size.

The first and second embodiments may be modified as follows.

The positions of the positive electrode active material 13 and the negative electrode active material 15 may be reversed. In other words, the negative electrode active material 15 may be placed on the inner bottom surface 11a side of the container 11 and the positive electrode active material 13 may be placed on the opening side. In this case, it is necessary for the positive electrode electricity collector to be in sheet form with at least a portion of the sheet protruding outside from the opening of the container 11 and for the sealing plate 12 and the container 11 to be welded in such a state where the portion of the sheet is disposed between the sealing plate 12 and the container 11.

Although in the first and second embodiments the negative electrode electricity collector sheets 21 and 35 protrude in the four directions from the opening of the container 11, only a portion thereof, for example, may protrude. In brief, when the sealing plate 12 and the container 11 are welded, the degree of protrusion may be changed appropriately as long as at least a portion of the sheets 21 and 35 is sandwiched between the sealing plate 12 and the upper surfaces 11c of the side walls 11b of the container 11.

The thickness of the negative electrode electricity collector sheet 21 is 5 micrometers, and it is preferably 20 micrometers or smaller. More preferably, the thickness is 5 micrometers to 10 micrometers. When the thickness of the negative electrode electricity collector sheet 21 is too great, the protruding portions may form a step and sometimes insufficiently fused when parallel seam welding using the principle of resistance welding is carried out. In contrast, when the thickness is too small, the strength of the sheet 21 becomes too weak, thus making the sheet 21 difficult to handle. At the same time, the sheet 21 is accidentally cut at the time of parallel seam welding, thereby causing a problem in the electrical conductance.

The container 11 may be formed of a heat resistant material, for example, a heat resistant resin, glass, ceramics and ceramic glass instead of being formed by sintering green sheets made of alumina. In this case, wires are provided on the glass or glass ceramics having a low melting point through the printing of a conductor, and the material is layered and sintered at a low temperature.

The material of the metal ring 17 is not limited to Kovar having a coefficient of thermal expansion which is close to the coefficient of thermal expansion of the container 11 made of alumina and may be changed to an appropriate conductive material of which the coefficient of thermal expansion is close to that of the container 11.

The material of the positive electrode electricity collector 16 is not limited to tungsten. For example, Vanadium, silver, platinum and gold, which can be formed by a thick film method, are preferable. In addition, aluminum or carbon may also be used. When the positive electrode electricity collector 16 is formed on the inner bottom 11a of the container 11, gold or tungsten is particularly preferable. This is because gold and tungsten both have a high withstanding voltage and do not fuse when a high potential is applied to the plus electrode, in other words, the positive electrode side.

The container 11 and the sealing plate 12 may be welded using a laser instead of being welded through seam welding using resistance welding.

The electrochemical element may be applied to a non-aqueous electrolyte battery instead of being embodied as the electric double layer capacitor 10.

Figure 5:
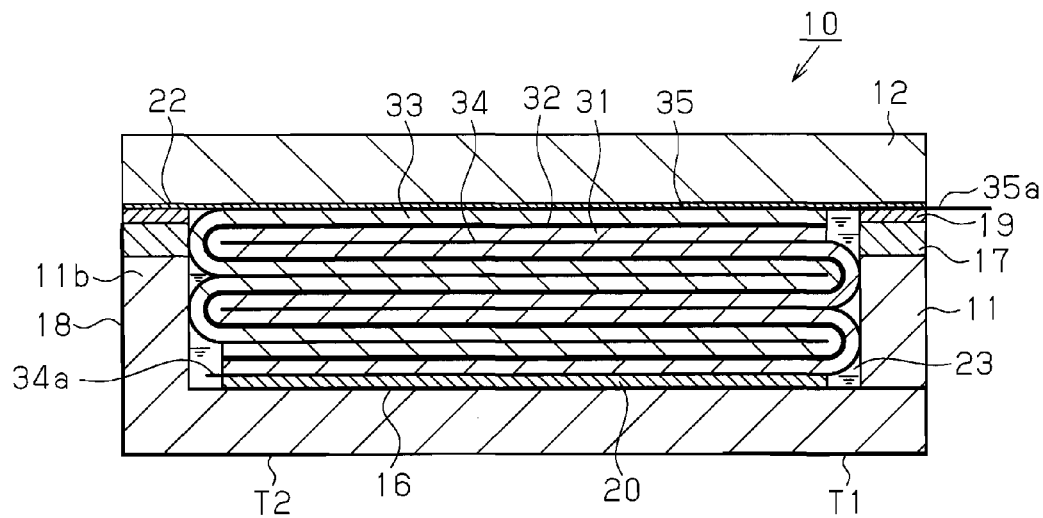
FIG. 5 is a cross sectional diagram illustrating another example of an electric double layer capacitor.

In the second embodiment, the capacitor cell in sheet form is folded in such a manner as to be wound. Alternatively, as shown in FIG. 5, the capacitor cell in sheet form may be folded in a zigzag pattern before being contained in the container 11.

Figure 6:
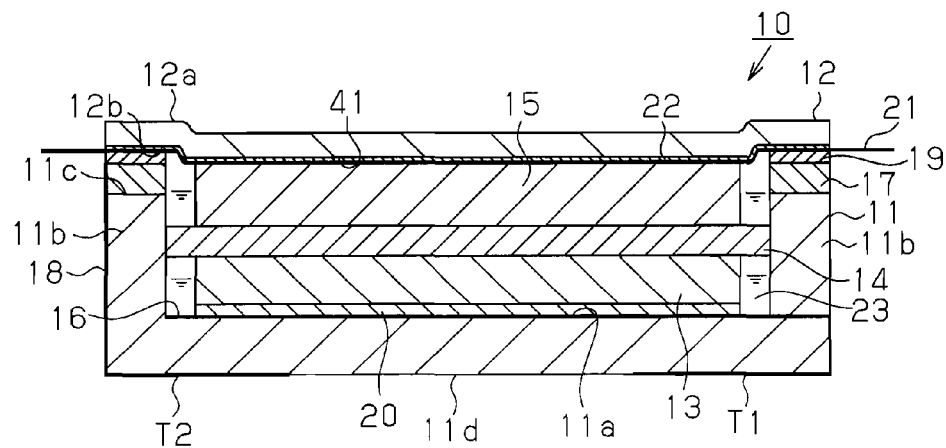
FIG. 6 is a cross sectional diagram illustrating yet another example of an electric double layer capacitor.

As shown in FIG. 6, a concave may be formed in the upper surface 12a of the sealing plate 12, while a convex 41 may be formed on the lower surface 12b of the sealing plate 12 so that the convex 41 can be engaged with the opening of the container 11 instead of using the sealing plate 12. In this case, the convex 41 functions as a guide, thus making easy the positioning of the sealing plate 12 relative to the container 11, and therefore, welding of the container 11 and the sealing plate 12 becomes easy. In addition, the convex 41 can apply an appropriate pressure to the negative electrode active material 15 after welding, and thus, the electrical connection between the negative electrode electricity collector sheet 21 and the negative electrode active material 15 can be made to be more reliable.

The present examples and embodiments are to be considered as illustrative and not restrictive and the invention is not to be limited to the details given herein, but may be modified within the scope and equivalence of the appended claims.

What is claimed is:

1. An electrochemical element, comprising:
a container including a side wall defining a cavity and an outer surface, wherein the side wall has an upper end portion, where the upper end portion defines an opening, a metal film is formed on the upper end portion, a pair of external terminals are formed on the outer surface and the metal film is electrically connected to one of the pair of external terminals;
a sealing plate sealing the cavity of the container along the upper end portion of the side wall, where a brazing material is placed on the sealing plate, and the container is sealed with the sealing plate by welding a portion of the brazing material on the sealing plate and a portion of the metal film of the container which make contact with each other together in a state where a first electrode active material, a separator, a second electrode active material and an electrolyte are contained in the container; and
an electricity collector sheet placed to close the opening defined by the container, which is formed integrally with the second electrode active material, where the electricity collector sheet includes an extending portion that extends onto the upper end portion of the side wall of the container so that the container and the sealing plate are welded together with the extending portion with the extending portion held between the sealing plate and the metal film on the upper end portion, wherein the electricity collector sheet is configured to be separated from the sealing plate before the container and the sealing plate are welded.

2. The electrochemical element according to claim 1, wherein the electricity collector sheet is made of nickel.

3. The electrochemical element according to claim 1, wherein a concave is formed in an upper surface of the sealing plate, and a convex to be engaged with the opening of the container is formed on a lower surface of the sealing plate.

4. The electrochemical element according to claim 1, wherein the container is made of alumina and the metal film and the sealing plate are made of Kovar.

5. The electrochemical element according to claim 4, wherein a brazing material, which is made of nickel plating, is placed on the surface of the sealing plate that faces the container, and a brazing material made of a nickel and gold plating is placed on top of the metal film.

6. The electrochemical element according to claim 1, wherein the first electrode active material, the separator and the second electrode active material are layered on top of each other to form a multilayer body, and the multilayer body is contained in the container without being folded.

7. The electrochemical element according to claim 1, wherein the first electrode active material, the separator and the second electrode active material are layered on top of each other to form a multilayer body, the electricity collector sheet is a second electricity collector sheet, the electrochemical element further comprises a first electricity collector sheet which is electrically connected to the first electrode active material and the multilayer body is folded in such a manner that the first electricity collector sheet and second electricity collector sheet appear on the sides of the container facing each other when being contained in the container.

8. The electrochemical element according to claim 1, wherein the container has four side walls, the upper end portion corresponds to upper end portions of the four side walls and the extending portion of the electricity collector sheet extends onto the upper end portions of the four side walls.

\* \* \* \* \*

UNITED STATES PATENT AND TRADEMARK OFFICE
CERTIFICATE OF CORRECTION

PATENT NO.         : 8,916,289 B2                                                     Page 1 of 1
APPLICATION NO.    : 12/036795
DATED              : December 23, 2014
INVENTOR(S)        : Watanabe et al.

It is certified that error appears in the above-identified patent and that said Letters Patent is hereby corrected as shown below:

In the Specification:

On column 3, line 31, delete "lid" and add --11d--

Signed and Sealed this
Fourteenth Day of July, 2015

Michelle K. Lee
*Director of the United States Patent and Trademark Office*